United States Patent Office 2,877,276
Patented Mar. 10, 1959

2,877,276

REMOVAL OF WATER FROM HALOGENATED HYDROCARBONS

James C. Cowan, Barberton, Richard F. Sanders, Akron, and Robert D. Shelton, Barberton, Ohio, assignors to Columbia-Southern Chemical Corporation No Drawing. Application November 21, 1955
Serial No. 548,245

5 Claims. (Cl. 260—654)

The present invention relates to the treatment of halogenated hydrocarbons, especially chlorinated unsaturated hydrocarbons, and it more particularly deals with removal of water from such halogenated hydrocarbons.

Halogenated hydrocarbons such as trichloroethylene often contain water, the removal of which is desirable. Phase separation of the immiscible portion of water from the halogenated hydrocarbon is not entirely satisfactory when particularly pure, low water content product is required. A minor but nevertheless significant amount of water is soluble in trichloroethylene, perchloroethylene, and the like halogenated hydrocarbons of 1 to 4 carbon atoms and hence is not effected by phase separation.

In certain instances the solubility of water in such halogenated hydrocarbons may be reduced by cooling. However, such cooling it has been found, is accompanied by the formation of fine ice particles. Usual mechanical separating expedients like filtration are not adequate for separating these fine ice particles. Also, the ice particle formation offers mechanical difficulties and results in diminished heat transfer efficiency in the cooling apparatus.

According to the present invention, halogenated hydrocarbons such as trichloroethylene are treated to separate at least a substantial portion of water equivalent to that quantity soluble therein at temperatures of 0° C. and above. This is accomplished by cooling the halogenated hydrocarbon preferably to a temperature below the cloud point of the trichloroethylene while it is in contact with an aqueous salt solution, e. g. a calcium chloride solution, and subsequently separating, usually by phase separation or comparable mechanical expedient, the halogenated hydrocarbon. By such process, the formation of fine ice particles is avoided. The water content of the halogenated hydrocarbon is below the cloud point of the cooling temperature indicating a more effective removal of water by comparison with just cooling.

Halogenated hydrocarbons subjected to the present treatment are those containing from 1 to 4 carbon atoms. Unsaturated chlorinated hydrocarbons containing from 2 to 4 carbon atoms such as trichloroethylene and perchloroethylene are of particular efficiency by this invention. However, other chlorinated hydrocarbons such as chloroform, carbon tetrachloride, tetrachloroethane, etc. as well as other halogenated and mixed halogenated hydrocarbons containing up to 4 carbon atoms may have their water content reduced.

In performance of this invention, a halogenated hydrocarbon such as trichloroethylene containing dissolved water is admixed or otherwise contacted with an aqueous salt solution. The trichloroethylene is normally at temperatures on the order of 20° C. to 50° C. and contains a quantity of water at least equivalent to the solubility of water in trichloroethylene at a temperature of 5° C. This amounts to about 0.01 percent water by weight in the trichloroethylene. Even larger quantities of water may be present.

Trichloroethylene may be saturated with water, or even contain water in excess of its solubility in the trichloroethylene. In conjunction with the manufacture and purification of trichloroethylene, this excess of water above its solubility in the trichloroethylene at the specified temperature is usually caused by inefficient or incomplete phase separation. It is however usually expeditious to remove, by phase separation, the water which is immiscible.

After removing the immiscible water, it may be also advantageous to cool the trichloroethylene to a temperature above the freezing point of water, e. g. to 3 to 5° C., to remove some additional water prior to contacting with the aqueous salt solution and further cooling to below the freezing point of water.

Aqueous salt solutions used herein have freezing points substantially below the temperature at which the trichloroethylene is to be cooled. An outstanding salt solution is aqueous calcium chloride solution containing from 20 to 55 percent by weight calcium chloride. Most expeditious practices dictate utilization of aqueous calcium chloride solutions, or other salt solutions, containing salt concentrations which preclude the separation of solid salt during the cooling step. Aqueous calcium chloride solutions containing between 35 and 40 percent calcium chloride, notably about 40 percent calcium chloride, have been found admirably suitable. Other aqueous solutions of chloride salts such as copper chloride, iron chloride, potassium chloride, sodium chloride, barium chloride, etc. can be utilized. Strongly alkaline or acidic salt solutions, although operable are not preferred, usually because high quality trichloroethylene is required to be essentially neutral, or at most, but slightly alkaline. Highly alkaline or acidic salts tend to impart a pH to the trichloroethylene which does not comply with this requisite.

In contact with the aqueous calcium chloride solution, the trichloroethylene is cooled to a temperature at which a substantial portion of the water initially dissolved therein separates upon removal of the aqueous phase. Normally, the trichloroethylene and aqueous salt solution are cooled to below 5° C. but above the freezing point of the system. Minimum attained temperatures rarely are below minus 30° C. and most frequently are limited to minus 10° C. or minus 15° C. One specific cooling reduces the temperature of the trichloroethylene to between 2° C. and minus 2° C.

This cooling may be effected by simple heat removing expedients. In one embodiment, the trichloroethylene may be contacted with the aqueous salt solution already cooled to the point where the dilution with trichloroethylene at normal temperature, say 20° C. to 50° C., accomplishes the overall temperature reduction of trichloroethylene to below 5° C. Or, after contacting the trichloroethylene with aqueous salt solution, the mixture may in a distinct step be cooled.

After reducing the temperature of the trichloroethylene, the aqueous salt solution is separated by phase separation or comparable expedients for separation of organic or aqueous inorganic phases.

The following example illustrates the manner in which the present invention may be practiced:

*Example I*

Trichloroethylene having a cloud point of 19° C. (denoting the trichloroethylene contains a quantity of water equivalent to the solubility of water and trichloroethylene at 19° C., e. g. about 0.016 percent water by weight) was admixed with equal parts of aqueous calcium chloride solution containing 40 percent by weight of calcium chloride. Thereafter, the trichloroethylene-aqueous calcium chloride was reduced in temperature to minus 1° C. by cooling in a heat exchanger provided with a cold brine jacketed cooler. After separating the aqueous salt solution from the trichloroethylene, the trichloroethylene had a cloud point of minus 6° C. indicating a water content equivalent to the solubility in water of trichloroethylene at minus 6° C.

On the other hand, when trichloroethylene having a cloud point of 19° C. was cooled to minus 1° C., it was difficult to remove the formed ice particles. One standard filter apparatus failed to remove the ice particles. Plugging and ice formation within the cooling apparatus was encountered which made cooling inefficient.

While the present invention has been described with reference to specific details of certain embodiments, it is not intended that the invention be limited thereto except insofar as such details are included in the appended claims.

We claim:
1. The method of removing water from a halogenated hydrocarbon which comprises contacting a halogenated hydrocarbon of 1 to 4 carbon atoms containing water with an aqueous liquid chloride salt solution, cooling the contacted halogenated hydrocarbon to below its cloud point temperature and above the freezing point of the system, and thereafter separating the halogenated hydrocarbon of a decreased water content.

2. The method of removing water from a halogenated hydrocarbon which comprises contacting a halogenated hydrocarbon of 1 to 4 carbon atoms containing at least 0.01 percent water by weight with an aqueous liquid chloride salt solution, cooling the contacted halogenated hydrocarbon to below 5° C. and above the freezing point of the system, and thereafter separating the halogenated hydrocarbon of a decreased water content.

3. The method of removing water from a halogenated hydrocarbon which comprises contacting a halogenated hydrocarbon of 1 to 4 carbon atoms substantially saturated with water with an aqueous liquid chloride salt solution, cooling the contacted halogenated hydrocarbon to below 5° C. and above the freezing point of the system, and thereafter separating the halogenated hydrocarbon of a decreased water content.

4. The method of removing water from an unsaturated chlorinated hydrocarbon which comprises contacting an unsaturated chlorinated hydrocarbon containing 2 to 4 carbon atoms and saturated with water with an aqueous liquid calcium chloride solution, cooling said chlorinated hydrocarbon to below 5° C. and above the freezing point, and thereafter separating the chlorinated hydrocarbon which has a decreased water content.

5. The method of removing water from trichloroethylene which comprises contacting trichloroethylene containing at least 0.01 percent by weight of water with an aqueous liquid calcium chloride solution of 20 to 55 percent calcium chloride, cooling the contacted trichloroethylene to below 5° C. and above the freezing point of the contacted trichloroethylene and thereafter separating the cooled trichloroethylene which has a reduced water content.

References Cited in the file of this patent

UNITED STATES PATENTS

| | | |
|---|---|---|
| 875,232 | Acker | Dec. 31, 1907 |
| 1,697,483 | Van Arsdel et al. | Jan. 1, 1929 |
| 2,000,881 | Coleman | May 7, 1935 |
| 2,193,569 | Seaton | Mar. 12, 1940 |
| 2,193,570 | Seaton | Mar. 12, 1940 |
| 2,758,139 | Bordner | Aug. 7, 1956 |